United States Patent Office 3,173,953
Patented Mar. 16, 1965

3,173,953
PROCESS FOR THE PREPARATION OF N-METHYL-HYDROXYLAMINE SULFATE
John Robert McWhorter, Jr., Wilmington, Del., assignor to E. I. du Pont de Nemours and Company, Wilmington, Del., a corporation of Delaware
No Drawing. Filed Dec. 3, 1962, Ser. No. 241,531
5 Claims. (Cl. 260—583)

This invention relates to the catalytic hydrogenation of nitromethane to N-methylhydroxylamine sulfate and is more particularly directed to such processes in which the hydrogenation is conducted at a hydrogen pressure of 300 to 800 p.s.i.g. in the presence of a palladium catalyst, in the presence of a solvent for nitromethane which is immiscible in water, and in the presence of at least 1 equivalent of $H_2SO_4$ for each mole of nitromethane, the temperature being maintained during hydrogenation between 30 and 100° C.

When nitromethane is hydrogenated in the presence of a solvent for the nitromethane and also in the presence of a sulfuric acid phase, the sulfuric acid combines chemically with the N-methylhydroxylamine as it forms effectively removing it from the reaction and preventing overreduction to unwanted methylamine. The two-phase system including a solvent not only functions as described to prevent the production of unwanted products but additionally the solvent serves to reduce the explosion hazard otherwise present in handling nitromethane.

The processes of the invention are believed to proceed as follows:

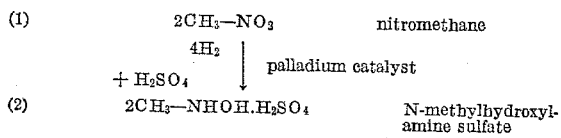

According to processes of the invention the nitromethane is introduced into a pressure vessel as a solution in a suitable solvent. The solvent should be one which dissolves nitromethane and should preferably be immiscible with the aqueous sulfuric acid phase. There can be used one or a mixture of such solvents as benzene, xylene, n-butyl alcohol, isobutanol, sec-butanol, n-amyl alcohol, and isoamyl alcohol. It is much preferred to use toluene as the solvent.

The proportion of solvent to nitromethane can vary widely and in general can range from a ratio of the parts by volume of solvent to the parts by volume of nitromethane from 1:9 to 9:1. More specifically it is usually preferred to use about equal parts of solvent and nitromethane and more specifically equal parts of toluene and nitromethane.

Sulfuric acid is also introduced into the reaction vessel with the solvent and nitromethane and there should be at least one equivalent of $H_2SO_4$ for each mole of nitromethane. As a practical matter the amount of sulfuric acid will be such that there will be from about 1 to 10 equivalents of $H_2SO_4$ for each mole of nitromethane. More specifically it is preferred to use from about 1 to 1.2 equivalents of $H_2SO_4$ for each mole of nitromethane.

The concentration of the $H_2SO_4$ with respect to water is not at all critical. The use of a solvent makes the disposition of heat comparatively easy so that no large amount of water need be introduced. Generally as a practical matter the sulfuric acid will contain from about 30 to 80% of $H_2SO_4$ in water. More specifically, it will usually be desirable to use sulfuric acid containing 50 to 70% $H_2SO_4$.

It is observed that while reference is made to the proportion of sulfuric acid to water and to nitromethane and to the proportion of nitromethane to solvent, the components can be added during the process in a continuous process. All of the reactants can be added sequentially or continuously, it being important only to maintain a solvent phase containing nitromethane in the presence of a sulfuric acid phase, the relative proportions of reactant being about of the order described above.

In processes of the invention palladium is used as a catalyst and while it can be supported in conventional manner, it is preferred that the palladium be supported on forms of carbon such as lampblack, coconut charcoal and other commercial forms of carbon customarily used as a support for catalysts. The palladium catalyst can be prepared in customary fashion and can be prepared as a palladium oxide and later reduced either separately or in situ.

The amount of palladium upon a support, and preferably upon carbon, can range from about one-half to 10% by weight of palladium based upon the weight of support. It is specifically more preferred to use around 5% by weight of palladium on a support.

The amount of catalyst can be widely varied. Generally about 0.1 to 15 parts by weight of palladium should be used for each 10,000 parts by weight of nitromethane. The larger amounts can be used but are wasteful and smaller amounts can be used but with some sacrifice of reaction rate. In preferred processes of the invention about 1 to 2 parts by weight of palladium should be used for 10,000 parts by weight of nitromethane.

The catalyst can be recovered in customary manner and returned to the process. Carbon is particularly advantageous as a carrier because it can readily be burned out leaving the palladium metal for reuse.

The hydrogenation is conducted in conventional manner by applying gaseous hydrogen under pressure. The pressure can vary widely and it is ordinarily desired to use about 300 to 800 pounds per square inch gauge (p.s.i.g.) of hydrogen pressure. It is more specially preferred to use pressures of about 550 to 650 p.s.i.g.

It will be understood that inert gases can also be added and there can be used, for example, nitrogen.

The hydrogen should be intimately admixed with the solution or suspension of nitromethane using a suitable mixing or stirring device. The amount of hydrogen used is at least that required to complete the reaction. There is in practice an excess of hydrogen supplied over that which is reacted so as to maintain hydrogen pressure.

The temperature of the hydrogenation tends to rise because the reaction is exothermic and cooling should be applied if necessary to maintain the temperatures between about 30 and 100° C. More specifically it is preferred that the temperature be held at between 50 and 60° C.

Because of the presence of metal impurities from water and from the equipment, a small amount of a chelating agent can advantageously be included. Thus there can be used ethylene diamine tetraacetic acid, nitrilo triacetic acid, gelatin, and the like.

Example

To a stirred autoclave, charge in turn 1368 g. of a solution containing equal parts by weight of nitromethane and toluene, 2 g. of 5% Pd on carbon (coconut charcoal), and 1010 g. of 60% sulfuric acid in water. The autoclave is closed and pressured to 600 p.s.i.g. with hydrogen. The mixture is agitated to improved gas-liquid contact. Cooling water through internal coils is used to maintain a reaction temperature of 50° C. Hydrogen is fed to the clave to maintain a pressure of 600 p.s.i.g.

The reaction is complete when no more hydrogen is taken up by the reaction mass. The pressure is then vented and the two-phase mixture removed from the autoclave and separated. The heavy, aqueous phase contains the N-methylhydroxylamine sulfate, and the organic phase contains the used catalyst. The yield of N-methylhyroxylamine sulfate from nitromethane is 92%. Of the remainder of the nitromethane, 6% is converted to methylamine sulfate and 2% remains as unreacted nitromethane in the organic phase.

Similar results can be obtained by substituting an equal weight of benzene, xylene, n-butyl alcohol or n-amyl alcohol for the toluene in the initial charge.

What is claimed is:

1. A process for the catalytic hydrogenation of nitromethane to N-methylhydroxylamine sulfate in which the hydrogenation is conducted at a hydrogen pressure of 300 to 800 p.s.i.g. in the presence of a palladium catalyst, in the presence of a solvent selected from the group consisting of benzene, xylene, n-butyl alcohol, isobutanol, sec-butanol, n-amyl alcohol, isoamyl alcohol and toluene for nitromethane which is immiscible in water, and in the presence of at least one equivalent of $H_2SO_4$ for each mole of nitromethane, the temperature being maintained during the hydrogenation between 30 and 100° C.

2. A process of claim 1 in which the ratio of the parts by volume of solvent to the parts by volume of nitromethane is from 1:9 to 9:1, there being 1 to 10 equivalents of $H_2SO_4$ for each mole of nitromethane.

3. A process of claim 2 in which the solvent is toluene.

4. A process of claim 1 in which the hydrogen pressure is 550 to 650 p.s.i.g., the amount of catalyst is 0.1 to 15 parts per 10,000 parts by weight of nitromethane, the ratio of the parts by volume of the solvent selected from the group consisting of benzene, xylene, n-butyl alcohol, isobutanol, sec-butanol, n-amyl alcohol, isoamyl alcohol and toluene to the parts by volume of nitromethane is about 1:1, the amount of $H_2SO_4$ is 1 to 1.2 equivalents per mole of nitromethane, and the temperature during the hydrogenation is 50 to 60° C.

5. A process of claim 4 in which the solvent is toluene, the $H_2SO_4$ concentration with respect to water is 30 to 80%, the catalyst is 0.5 to 10% by weight of palladium supported on carbon and being used in the amount of 0.1 to 15 parts by weight for each 10,000 parts by weight of nitromethane.

No references cited.